United States Patent
Wilkosz et al.

[19]

[11] Patent Number: 5,960,049
[45] Date of Patent: Sep. 28, 1999

[54] PUMP SELECTION LOGIC

[75] Inventors: Stephen J. Wilkosz, Vernon; Deva R. Chari, Granby; James E. Robertson, South Glastonbury, all of Conn.

[73] Assignee: Combustion Engineering, Inc., Windsor, Conn.

[21] Appl. No.: 09/025,925

[22] Filed: Feb. 19, 1998

Related U.S. Application Data

[63] Continuation of application No. 08/724,081, Sep. 30, 1996, abandoned.

[51] Int. Cl.$^6$ ..................................................... G21C 15/00
[52] U.S. Cl. .......................... 376/210; 376/238; 376/297
[58] Field of Search ........................... 376/210, 236–238, 376/241, 242, 297

[56] References Cited

U.S. PATENT DOCUMENTS

| | | | |
|---|---|---|---|
| 4,075,059 | 2/1978 | Bruno et al. | 376/238 |
| 5,293,411 | 3/1994 | Miyamoto et al. | 376/210 |

OTHER PUBLICATIONS

Computers in Industry, vol. 21, pp. 93–99, Sculli et al., Jan. 1993.

*Primary Examiner*—Harvey E. Behrend
*Attorney, Agent, or Firm*—Alix, Yale & Ristas, LLP

[57] ABSTRACT

The operator of a nuclear steam supply system manually selects a lineup of either one, two, or three main feedwater pumps for normal reactor operation to generate power. This selection sets or resets a status latch for each pump, representative of intended pump operation. A system (RPCS) for implementing a step reduction in the power output of the reactor, includes an associated logic circuit which combines signals indicative of tripping of one or more pumps, with the pump status latches, to achieve the following outcomes: (a) with one pump selected, a trip of this one pump does not produce an RPCS trip demand signal (because the reactor will be tripped); (b) with two pumps selected, (i) a trip of one pump will produce an RPCS trip demand signal, whereas (ii) a trip of these two pumps will not produce an RPCS trip demand signal; (c) with three pumps selected, (i) a trip of one pump will not produce an RPCS trip demand signal (because the transient can be handled by the basic control system), (ii) a trip of two pumps will produce an RPCS trip demand signal, and (iii) a trip of three pumps will not produce an RPCS trip demand signal.

5 Claims, 2 Drawing Sheets

PUMP SELECTION LOGIC

CROSS REFERENCE TO RELATED APPLICATION

This is a continuing application of Ser. No. 08/724,081 filed Sep. 30, 1996, now abandoned.

BACKGROUND OF THE INVENTION

The present invention relates to nuclear power plants, and more particularly, to the automatic response of the nuclear reactor control system, to a sudden and unexpected loss of function of a major plant component.

The nuclear steam supply system (NSSS) of a pressurized water nuclear power plant, normally operates with minor perturbations in power and flow. These can be handled by the basic reactor control systems. Certain large plant imbalances can occur however, such as a large turbine load rejection, turbine trip or partial loss of on-line main feedwater pump capacity. Under these conditions, maintaining the NSSS within the control band ranges can be accomplished by rapid reduction of NSSS power at a rate which is greater than that provided by the normal high speed control rod insertion. In addition, rapid NSSS power reduction is effective in gaining sufficient thermal margin to accommodate inward control rod deviations (including spurious rod drops) without a reactor trip.

One known system for achieving this objective, is commercially available as the Reactor Power Cutback System (RPCS) from Combustion Engineering, Inc., Windsor, Conn. U.S. Pat. No. 4,075,059, issued on Feb. 21, 1978, for "Reactor Power Reduction System and Method", describes such RPCS. The disclosure of this patent is hereby incorporated by reference. The system is designed to accommodate large load rejections, the loss of one feedwater pump or inward deviations of control rods (including spurious rod drops), by providing a "step" reduction in reactor power. The step reduction in reactor power is accomplished by the simultaneous dropping of one or more preselected groups of full strength regulating control rods into the core. The control rod groups are dropped in their normal sequence of insertion. The RPCS also provides control signals to the turbine to rebalance turbine and reactor power following the initial reduction in reactor power as well as to restore steam generator water level and pressure to their normal controlled values.

Conventional NSSS have two steam generators and two variable speed main feedwater pumps which deliver secondary coolant water to a common conduit which divides and is controlled by a respective valve to each steam generator. On the occurrence of a loss of a steam generator feedwater pump, the flow of the secondary coolant to the steam generator is reduced, since the remaining pump is unable to provide 100% of the feedwater demanded by the steam generators. When this happens, the steam generator consumes water (by converting it into steam) faster than the water in the steam generator can be replaced, which results in a consequent drop of the water level in the steam generator. This situation cannot be tolerated for very long before the reactor and turbine are caused to trip on a signal indicating low steam generator water level. If the reactor power is immediately and rapidly reduced to a sufficient degree, however, the steam generator's ability to produce steam is reduced, thereby permitting avoidance of the reactor-turbine trip on a low steam generator water level. In the typical nuclear power plant, where two feedwater pumps with 65% of full feedwater flow capacity to each steam generator are provided, the initial reduction in power demanded by the loss of one feedwater pump in order to avoid a reactor trip is 75% of full reactor power. This restricted power, which allows continued reactor operation after the loss of a feedwater pump, is determined by the capacity of the pumps of the system and the characteristics of the steam generator.

For plant start-up, the feedwater pumps are started manually by the plant operators, either by providing steam and cooling water to a turbine driver or by supplying electricity to a motor driver. The pumps draw water from, and recirculate it to, a feedwater or condensate storage tank. When the pumps have been warmed up and checked for proper operation, their speed is manually set at a minimum controlled speed by the operators. When plant conditions allow switching one or both of the feedwater pumps to automatic control by a feedwater control system, the operators switch the control mode of the selected pump(s) to automatic. In automatic control, the feedwater control system will set the pump speed, and control valve positions, to maintain a pre-set water level in the steam generators.

In these plants, the feedwater pumps and the RPCS are operated in the following manner:

| Power Level | Feedwater Status | RPCS Status | Operator Actions | Plant Response |
|---|---|---|---|---|
| 0 to 50% | One FW pump ON (running at operating speed, supplying water to the steam generators) and second pump either ON but in standby (running at minimum recirculation speed, not supplying water to the steam generators), or OFF and out of service. | Out of service | Prior to raising power above 5% place Feedwater Control System in automatic. This controls the FW pump running at operating speed. After lowering power below 5%, place feedwater control in manual. | If the operating feedwater pump trips, reactor trip will be initiated on low level in the steam generator. |
| 50% to 100% | Both feedwater pumps ON and running at operating speed. | In service | At approximately 50% power (increasing), the second feedwater pump is placed in automatic control from the control room. The RPCS is placed in service when the second feedwater pump is placed in automatic control. | If one of the main feedwater pump trips, the reactor power cutback will be initiated by RPCS trip demand signal. |

The need has been identified for providing an NSSS with three main feedwater pumps; the third is to be used either as a spare or in a sharing mode with the other two. The conventional RPCS can easily be incorporated into an NSSS configuration with three main feedwater pumps, but the present inventors have conceived an improvement to the RPCS logic, which takes advantage of the greater operational flexibility afforded by a three pump NSSS.

SUMMARY OF THE INVENTION

It is, accordingly, an object of the present invention to provide an improved RPCS logic for an NSSS having at least three main feedwater pumps.

It is a further object, that the RPCS logic distinguish between a two pump lineup and a three pump lineup, when automatically generating an RPCS demand signal.

According to the invention, the operator of the NSSS manually selects a lineup of either one, two, or three main feedwater pumps for normal reactor operation to generate power. This selection sets or resets a status latch for each pump, representative of intended pump operation. A logic circuit combines signals indicative of tripping of one or more pumps, with the pump status latches, to achieve the following outcomes:

(a) With one pump selected, a trip of this one pump does not produce an RPCS trip demand signal (because the reactor will be tripped on, e.g., low steam generator water level).

(b) With two pumps selected, (i) a trip of one pump will produce an RPCS trip demand signal, whereas (ii) a trip of these two pumps will not produce an RPCS trip demand signal.

(c) With three pumps selected, (i) a trip of one pump will not produce an RPCS trip demand signal (because the transient can be handled by the basic control system), (ii) a trip of two pumps will produce an RPCS trip demand signal, and (iii) a trip of three pumps will not produce an RPCS trip demand signal.

Preferably, this logic is implemented with both redundant and confirmatory sublogic. For example, each feedwater pump trip generates two independent feedwater pump trip signals. Similarly, each pump status selection, enables two distinct status latches. These pump trip signals and pump status latches are paired in separate logic gate arrays, such that the trip of a particular one of the pumps selected for operation, should result in the generation of redundant RPCS trip control signals. The RPCS is not tripped, however, unless confirmed by an RPCS trip control signal generated by both of the pair of logic gate arrays.

The inventive method can also be generalized for use in a nuclear power plant having a nuclear reactor, at least three feedwater pumps for supplying water to the steam generator, a control rod system for controlling the power output of the reactor core, and a system for rapidly inserting some of the control rods into the reactor core to reduce the power output from an initial level to a non-zero level upon the loss of pumping operation of at least one feedwater pump. The method generates a demand signal for the system to rapidly insert some of the control rods, by the operator selecting which of the pumps are intended for pumping operation and which of the pumps have been removed from pumping operation. A trip signal is generated from each of the pumps intended for operation, which experiences a loss of pumping operation. A demand signal to actuate the system for rapidly inserting some of the control rods is generated only if a trip signal is generated by each of all but one of the selected pumps.

DESCRIPTION OF THE PREFERRED EMBODIMENT

Figure 1:
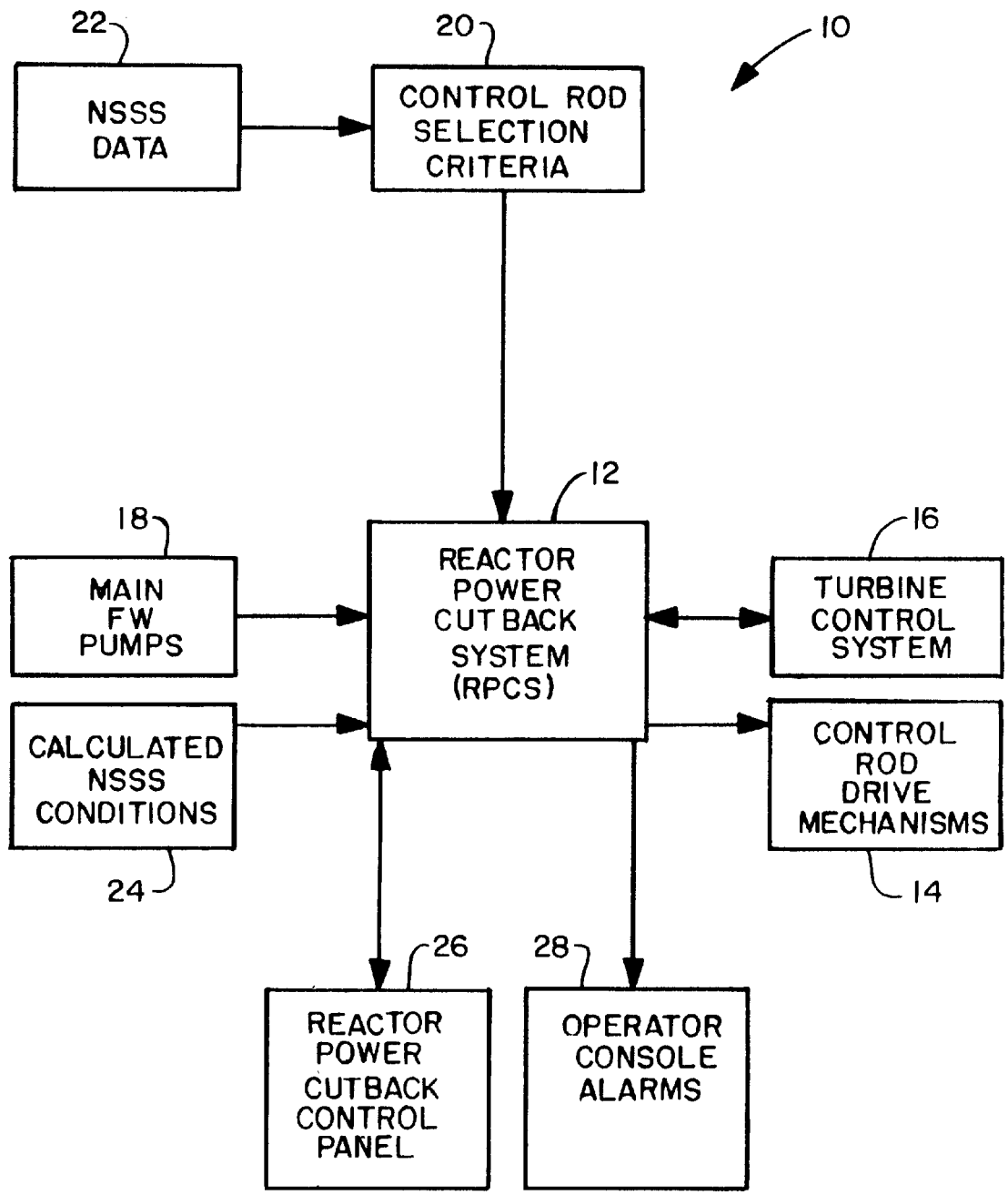
FIG. 1 is a functional logic diagram of a reactor power cutback system for a nuclear steam supply system.

FIG. 1 schematically represents an overview 10 of the functional components associated with the reactor power cutback system (RPCS) 12. When in service and confronted with certain transients, the reactor power cutback system sends control signals to the control rod drive mechanisms 14, and interacts with the turbine control system 16, to stabilize the power of the NSSS at a reduced, but non-zero level. If the RPCS cannot stabilize the NSSS by a combination of turbine runback and adjustment of the regulating control rod groups, the RPCS trips one or more groups of control rods.

For purposes of the present invention, a logic scheme is associated with the conditions under which a reactor power cutback system trip demand signal is generated at demand block 18, for processing in the RPCS 12. The processing in functional block 12 includes, for example, the control rod selection criteria 20, which in turn is dependent on NSSS data 22 supplied by sensors in the plant. Other calculated conditions of the NSSS are supplied from block 24, to the RPCS 12. The RPCS 12 is also subject to action taken at the reactor power cutback control panel 26, and alarms are generated by the RPCS 12 for display at the alarm section of the operator console at 28.

Figure 2:
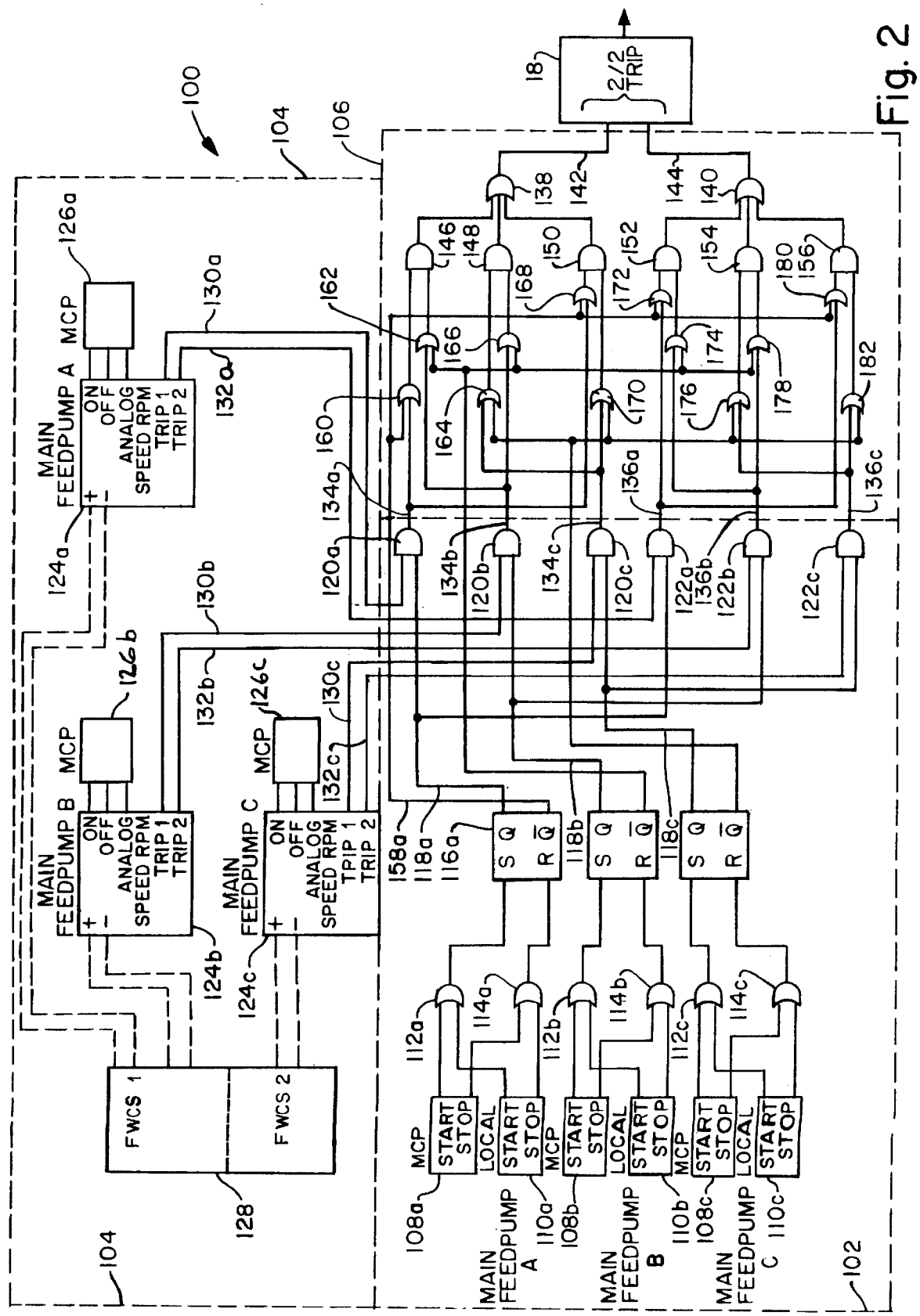
FIG. 2 is a logic diagram of a circuit for generating a reactor power cutback demand signal resulting from loss of one or more out of up to three main feedwater pumps, in accordance with the preferred embodiment of the invention.

FIG. 2 shows the pump selection logic circuit 100 for three main feedwater pumps, A, B, and C. This circuit can be divided into four functional sections: (1) the pump selection and enablement section 102; (2) the feedwater pump trip signal section 104; (3) the logic implementation section 106; and (4) the RPCS trip demand section 18. The function of the demand section 18 in FIG. 2 can, for purposes of the present description, be considered to be the same as the function of block 18 in FIG. 1.

The section 102 has, for each main feed water pump A, B, and C, at least one switch 108, and preferably at least one more switch 110, by which the operator can select whether or not that particular pump is intended to be fully operational for normal power production in the plant. When fully operational, pump speed control above e.g., 5% plant power, would automatically be adjusted by an automatic feedwater control system (not shown). When not fully operational, the pump is either on but in standby, or off and out of service. Thus, the operator can designate which, if any, of the pumps have been intentionally disabled from automatically controlled operation. The automatic feed water control system controls the variables of pump speed and valve position to maintain a preset water level in the steam generators. Although not normally utilized in the operation of an NSSS, an operational pump could, under the manual control of the operator, in effect be in a "stand-by" condition, whereby the pump rotates at a minimum recirculation speed corresponding to the flow to the steam generators produced by the other pumps.

In the illustrated embodiment, main feed pump A has associated therewith, a switch 108A which can be manually toggled to the start or stop position, at either the main panel in the plant control room, or locally at, for example, the motor control center associated with the feed pump system. "Start" corresponds to selection of the pump as intended for full operation. "Stop" designates disablement from full operation, i.e., "off" or in standby. As used hereinafter, "operational" means "fully operational". The logical condition of each switch 108A, 110A, is delivered to a pair of logical OR gates 112A, 114A, the outputs of which are delivered to a flip-flop circuit 116A. The output Q of the circuit 116A on line 118A, will be a logical "1" when the operator selects the start condition for pump A at either switch 108A or 110A. This logical "1" is delivered to AND gate 120A, which operates as an enabling latch, indicative of whether the particular pump status is intended to be operational.

It should be appreciated that each of the main feed water pumps B and C has associated switches 108B and C; 110B and C; 112B and C; 114B and C; 116B and C; 118B and C; and 120B and C.

Preferably, the status latches are also arranged with redundancy, such that the logical conditions at outputs 118A, 118B and 118C, are each delivered to a respective second AND gate 122A, 122B, and 122C. Thus, by way of example, if the operator manually selects the start condition for main feedwater pump A via either switch 108A, or 110A, latches 120A and 122A, will both be enabled, redundantly.

The feedwater pump trip signal section 104, includes the three main feedwater pumps A, B and C indicated respectively 124A, 124B and 124C, each of which is responsive to inputs from the main control panel, as indicated at 126A, B and C, as well as from one or more feedwater control systems, indicated at 128. The feedwater control system 128 and associated control logic for generating a trip signal, form no part of the present invention. It should be appreciated, however, that for each pump such as 124A, a trip of that pump will result in the generation of two trip signals 130A, 132A, which are delivered to the latches 120A and 122A, respectively. In similar fashion, trip signals 130B, 132B and 130C, 132C are delivered to the latches 120B, 122B, and 120C, 122C, respectively. When the inputs to any particular latch gate 120A, B, C or 122A, B or C are both logical "1", a respective logical "1" output signal is generated on a respective line 134A, B or C, or 136A, B or C.

The logic implementation section 106 includes a RPCS trip control gate 138, which under specified conditions, passes a RPCS trip control signal on line 142 to the RPCS system 18. Preferably, another RPCS trip control gate 140 is also present, from which a trip control signal is passed along line 144 to the demand block 18. Thus, in the preferred embodiment, the actual RPCS trip demand signal is not generated at 18 for delivery to the reactor power cut back system 12 (see FIG. 1), unless a trip control signal is present on both lines 142 and 144.

The OR gate 138 receives signals from three AND gates 146, 148, and 150. If any one of these AND gates generates a logical "1" output, the gate 138 generates a control signal on line 142. Similarly, as part of the redundancy described above, the OR gate 140 will pass a trip control signal on line 144, if the output of any one of the AND gates 152, 154, or 156 is a logical "1". Each of the AND gates 146–156 will generate a logical "1" output signal, if and only if a logical "1" is input to the AND gate, from signals corresponding to the condition of two different pumps.

It should be appreciated that the invention is especially significant in distinguishing between an initial condition wherein only two of the three feedwater pumps are intended to be in operation, from the condition wherein all three of the feedwater pumps are intended to be in operation. The OR gates 160–182 interposed between the AND gate arrays 120, 122 and 146–156, play a role in, for example, the generation of a RPCS trip demand signal if one of only two operational pumps is tripped, while inhibiting the generation of a trip demand signal, if only one of three operational pumps trips. In essence, the AND gates 146–156 require a two out of three pump trip condition in order to pass a logical "1" signal to OR gate 138, 140. If, for example, main feed pump A is not in operational service, i.e., is being used as a spare, it is considered equivalent to a tripped pump in a configuration where three pumps are intended to be in operation. Therefore, when both switches 108A, 110A are in the stop condition, the Q output signal at flip flop 116A is a logical "1" on line 158A. In this condition, the output signal Q is a logical zero, and therefore gate 120A is not enabled.

Nevertheless, in order to achieve the desired generation of a trip control signal on line 142 (and line 144) when one of either pump B or C trips, the logic section 106 must produce the same output, as it would under the conditions of pumps A and B tripping during plant operation for which all three pumps A, B and C are intended to be operational. Therefore, the logical "1" from the Q output of the flip flop 116A is delivered to the OR gate 160, such that the logical "1" can be passed to the AND gate 146. If, in the example of a trip of pump B, the AND gate 120B passes a logical "1" through the OR gate 162 to the AND gate 146, gate 146 will pass a logical "1" to the OR gate 138, and on to the demand section 18 via line 142.

In this manner, gate 146 is responsive to the condition of both pumps A and B. Due to the redundancy described above, gate 152 is similarly influenced by the condition of pumps A and B. Output of gates 146 and 152, will be a logical "1" if, and only if, (a) pump A or B is considered non-operational as a result of the "stop" settings in section 102, and a trip of pump B or A occurs, respectively; or, (b) pumps A and B are both intended to be operational as indicated by the "start" settings on the switches in section 102, and trip signals from both pumps A and B are generated.

It can also be appreciated that, if all the pumps that are intended to be in operation, trip coincidentally, neither of the gates 138 or 140 passes a RPCS trip control signal to the trip demand section 18. Under this condition, the reactor will fully trip on low steam generator level, thereby reducing the power from fission essentially to zero, rather than merely cutting the power back to a lower but non zero value, as a result of the actuation of the RPCS 12.

In NSSS with three main feedwater pumps, each provides about 33.3% of the feed water required for the steam generators, but with a maximum capacity of at least 50% each. The Reactor Power Cutback System according to the invention is preferably used in the following manner:

| Power Level | Feedwater Status | RPCS Status | Operator Actions | Plant Response |
|---|---|---|---|---|
| 0 to 40% | One FW pump ON (running at operating speed, supplying water to the steam generators); second pump ON but at standby (running at minimum speed, not supplying water to the steam generators); third pump OFF. | Out of service | Prior to raising power above 5% place Feedwater Control System in automatic. Operator will make selection of pumps in operation or standby via pump selection logic. | If the operating feedwater pump trips will likely result in a plant trip. |
| 40% to 70% | Two feedwater pumps are ON running at operating speed and the third ON in standby. | Placed in service at approximately 50% to 60% power. | At approximately 40% power, the second FW pump will be placed in service. The operator will choose the pumps in operation at the FW system control panel and the choices are recognized by the RPCS selection logic. | If one feedwater pump at operating speed is tripped, the speed of the second operating feedwater pump will be increased by the feedwater control system. |

-continued

| Power Level | Feedwater Status | RPCS Status | Operator Actions | Plant Response |
|---|---|---|---|---|
| | | | | Depending on the initial power level, the RPCS will generate a trip demand signal to cut back power by dropping rods to quickly reduce power and will initiate turbine runback. If both feedwater pumps trip, the reactor will trip on low level in steam generator. |
| 40% to 100% | Two feedwater pumps ON and third OFF and out of service | Placed In service at approximately 50% to 60% power | At approximately 40% power the second pump will be placed in service. The operator will choose the pumps in operation at the FW system control panel and the choices are recognized by the RPCS selection logic. | If one pump trips, RPCS will generate an RPCS trip demand signal. If both FW pumps trip, the plant will trip. |
| 70% to 100% | All three feedwater pumps are ON and running at operating speed. | In service | At about 70%, the third feedwater pump is placed in service and this is recognized by RPCS selection logic. | If one pump trips, the other two pumps will compensate for the loss of the third pump. If two pumps are lost, RPCS will generate an RPCS trip demand signal. |

It can thus be appreciated from the foregoing description, that the RPCS is in service only when at least two feedwater pumps are in full operation and the feed water control system is in the automatic mode. The conventional RPCS (inventive RPCS) is always in service when the reactor power is at least 50% (50%–60%), and the feedwater control system is in the automatic mode. The feedwater control system is always on, when power is at least 50%. This relationship between the reactor power cut back system and the feedwater control system can be implemented in a variety of ways. Preferably, the RPCS will automatically sense (without operator intervention) from the feedwater control system, which of the feedwater pumps are intended to be operational. Therefore, the switch means for manually selecting which of the pumps are intended for pumping operation and designating which of the pumps have been disabled from pumping operation, can be the same switch means used by the operators at the control panel, for placing pumps in service. As the power level passes 50% and the RPCS is placed in service, the RPCS will "read" the pump status as previously selected by the operator. Alternatively, the RPCS could be designed such that as the power level increases through approximately 50%, and the RPCS is placed in service, the operator manually selects via switches dedicated to the RPCS, which of the feedwater pumps are intended to be operational.

It should also be understood that the functionality described above can be implemented in a variety of ways that would be readily available to one of ordinary skill in this field of technology. For example, programmable logic controllers, or other programmed logic via computer software, may be substituted.

We claim:

1. In a pressurized water nuclear power plant having a nuclear reactor, at least one steam generator, a plurality of feedwater pumps for supplying water to the steam generators, a first system, for controlling the power output of the reactor core by insertion of control rods into the core at a normal rate, and a second system, including means for rapidly inserting some of the control rods into the reactor core at a faster rate than said normal rate to reduce the power output from an initial level to a non-zero level upon the substantially total loss of pumping operation of a feedwater pump, the improvement for a plant having three feedwater pumps for said steam generators, comprising:

switch means for manually selecting which of the three pumps are intended for pumping operation and designating which, if any, of the three pumps have been intentionally disabled from pumping operation;

means for generating a pump trip signal, respectively, from each of the pumps intended for operation, when a particular pump intended for operation experiences a substantially total loss of pumping operation;

means in said second system responsive to the switch means and the means for generating a pump trip signal, for generating a demand signal to rapidly insert some of the control rods, only when two pumps have been selected, and a pump trip signal is generated from only one of the selected pumps, or when three pumps have been selected, and a pump trip signal is generated from each of any two, but not all, of the selected pumps.

2. The nuclear power plant of claim 1, wherein the means responsive to the switch means and the means for generating a pump trip signal includes, a flip-flop circuit associated with the switch means for each pump, respectively, for generating a first signal on a first line if the pump has been selected or a second signal on a second line if the pump has been designated, an enabling AND gate electrically connected to the first line of each of the flip-flop means, respectively, and to the means for generating a pump trip signal, respectively, such that each enabling AND gate passes a logical "1" output, only upon the coincidence of a first signal and a pump trip signal, and an OR gate electrically connected to the output of each said enabling AND gates and to each said second lines, respectively.

3. The nuclear power plant of claim 2, wherein the means responsive to the switch means and the means for generating a pump trip signal includes, a logical AND gate for each possible combination of two of said feedwater pumps, each logical AND gate being responsive to the output of one of said OR gates connected to the second line associated with one pump, and the output of another of said OR gates connected to the second line associated with another of said pumps.

4. In a pressurized water nuclear power plant having a nuclear reactor, at least two steam generators, three feedwater pumps for supplying water to the steam generators, a first system, for controlling the power output of the reactor core by insertion of control rods into the core at a normal rate, and a second system, including means for rapidly inserting some of the control rods into the reactor core at a rate faster than said normal rate to reduce the power output from an initial level to a non-zero level upon the substantially total loss of pumping operation of at least one feedwater pump, a method for generating a demand signal for said second system to rapidly insert some of the control rods, comprising:

setting switch means for selecting which of the three pumps are intended for pumping operation and designating which of the three pumps, if any, are disabled from pumping operation;

generating a pump trip signal from each of the pumps intended for operation, which experiences a substantially total loss of pumping operation;

in response to the switch means settings and a pump trip signal, generating a demand signal for the second system to rapidly insert some of the control rods, only under the following conditions, (a) with one pump selected for operation and tripped, no demand signal is generated, (b) with two pumps selected for operation, only a trip of one selected pump generates a demand signal, and (c) with three pumps selected for operation, only a trip of two selected pumps generates a demand signal.

5. The method of claim 4, wherein the step of generating a demand signal is performed in a logic circuit having a pump status latch associated with each pump, respectively, each latch having a condition representative of whether or not each pump is intended to be operational, respectively, and the step of setting switch means, generates an enabling condition in a respective latch whereby a trip signal from a respective pump can pass through the logic circuit.

* * * * *